United States Patent
Park

(10) Patent No.: US 10,073,702 B2
(45) Date of Patent: Sep. 11, 2018

(54) MEMORY SYSTEM, COMPUTING SYSTEM INCLUDING THE SAME AND METHOD OF OPERATING MEMORY SYSTEM

(71) Applicant: SK hynix Inc., Gyeonggi-do (KR)

(72) Inventor: Jong Ju Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 71 days.

(21) Appl. No.: 14/829,322

(22) Filed: Aug. 18, 2015

(65) Prior Publication Data
US 2016/0274917 A1 Sep. 22, 2016

(30) Foreign Application Priority Data

Mar. 16, 2015 (KR) ........................ 10-2015-0036100

(51) Int. Cl.
  *G06F 9/44* (2018.01)
  *G06F 9/4401* (2018.01)
(52) U.S. Cl.
  CPC .......... *G06F 9/4401* (2013.01); *G06F 9/4403* (2013.01)
(58) Field of Classification Search
  None
  See application file for complete search history.

(56) References Cited

U.S. PATENT DOCUMENTS

| | | | | |
|---|---|---|---|---|
| 7,350,105 | B2 * | 3/2008 | Aasheim | G06F 3/0619 |
| | | | | 711/103 |
| 8,793,429 | B1 * | 7/2014 | Call | G06F 12/0246 |
| | | | | 711/103 |
| 2006/0023500 | A1 * | 2/2006 | Kawabata | G11C 7/1051 |
| | | | | 365/185.01 |
| 2008/0228997 | A1 * | 9/2008 | Farhan | G06F 3/0611 |
| | | | | 711/103 |
| 2012/0011298 | A1 | 1/2012 | Lee et al. | |
| 2014/0258588 | A1 * | 9/2014 | Tomlin | G06F 12/0246 |
| | | | | 711/103 |
| 2015/0100744 | A1 * | 4/2015 | Mirichigni | G06F 12/023 |
| | | | | 711/154 |

FOREIGN PATENT DOCUMENTS

| KR | 1020080063607 | 7/2008 |
|---|---|---|
| KR | 1020100059666 | 6/2010 |

* cited by examiner

*Primary Examiner* — Paul Yanchus, III
(74) *Attorney, Agent, or Firm* — IP & T Group LLP

(57) ABSTRACT

Disclosed is a memory system including: a semiconductor memory device; and a memory controller suitable for controlling the semiconductor memory device, and receiving a first command for accessing the semiconductor memory device, and a second command of a different type from that of the first command from a host. The memory controller completes preparation to perform an operation corresponding to the first command by performing a first booting operation when power is up, and outputs a first command ready signal to the host. The memory controller completes preparation to perform an operation corresponding to the second command by performing a second booting operation after the first booting operation, and outputs a second command ready signal to the host.

20 Claims, 5 Drawing Sheets

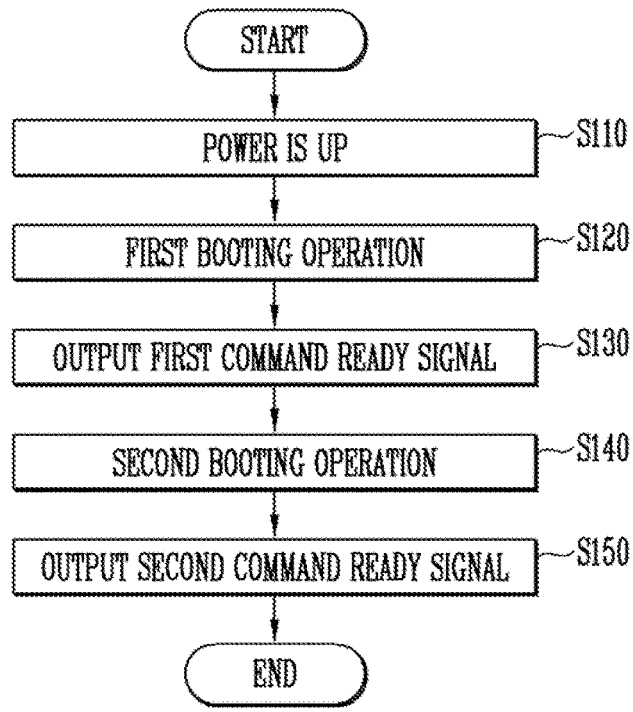
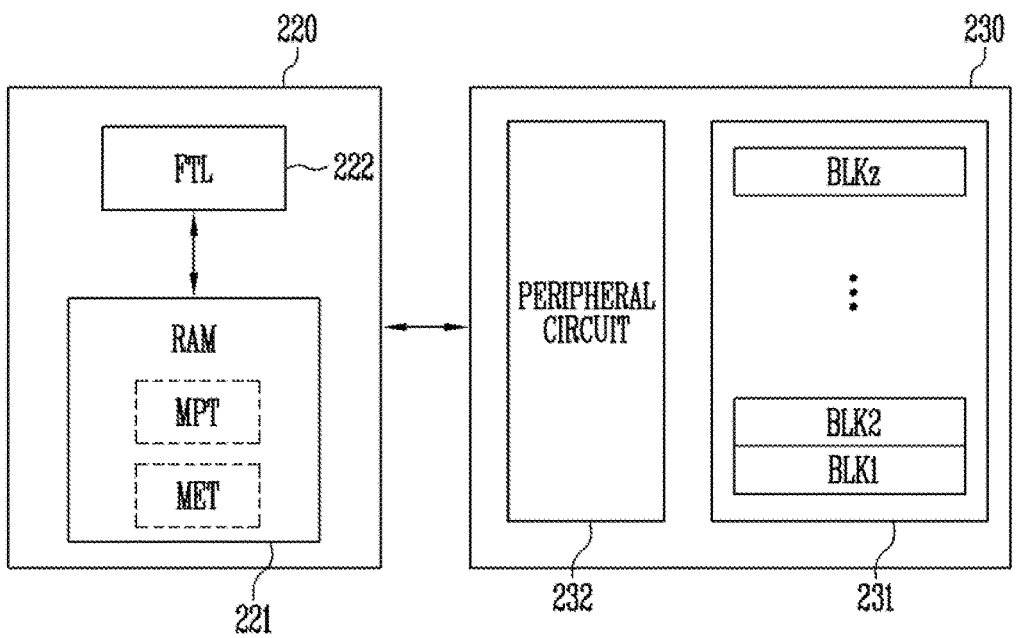

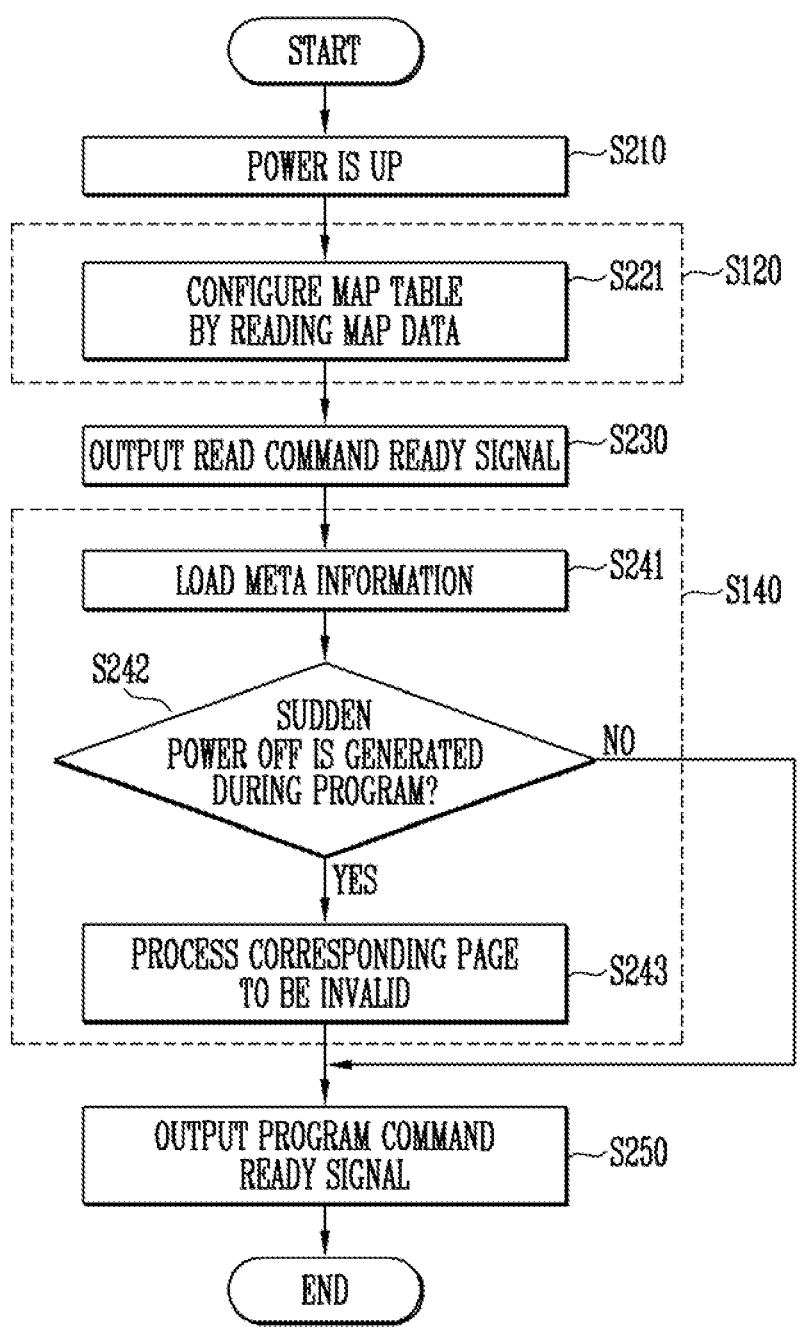

MEMORY SYSTEM, COMPUTING SYSTEM INCLUDING THE SAME AND METHOD OF OPERATING MEMORY SYSTEM

CROSS-REFERENCE TO RELATED APPLICATION

The present application claims priority to Korean patent application number 10-2015-0036100, filed on Mar. 16, 2015, in the Korean Intellectual Property Office, the entire disclosure of which is herein incorporated by reference in its entirety.

BACKGROUND

1. Field

The present invention relates to an electronic device, and more particularly, to a memory system including a semiconductor memory device and a memory controller, a computing system including the same, and a method of operating the memory system.

2. Discussion of Related Art

A semiconductor memory device is implemented with a semiconductor, such as silicon (Si), germanium (Ge), gallium arsenide (GaAs), indium phosphide (InP), and the like. Semiconductor memory devices are generally classified into volatile memory devices and nonvolatile memory devices.

Volatile memory devices are unable to retain data without a constant source of power. Examples of volatile memory devices include Static random access memory (SRAM), Dynamic RAM (DRAM), and Synchronous DRAM (SDRAM). Nonvolatile memory devices, on the other hand, are able to maintain their data without requiring a constant source of power. Examples of nonvolatile memory devices include Read Only Memory (ROM), Programmable ROM (PROM), Electrically Programmable ROM (EPROM), Electrically Erasable and Programmable ROM (EEPROM), flash memory, Phase-change RAM (PRAM), Magnetoresistive RAM (MRAM), Resistive RAM (RRAM), and Ferroelectric RAM (FRAM). Flash memory is generally divided into the NOR type and the NAND type.

SUMMARY

The present invention has been made in an effort to provide a computing system having improved operation speed.

An exemplary embodiment of the present invention provides a memory system, including: a semiconductor memory device; and a memory controller suitable for controlling the semiconductor memory device, and receiving a first command for accessing the semiconductor memory device, and a second command of a different type than that of the first command, from a host. The memory controller completes preparation to perform an operation corresponding to the first command by performing a first booting operation when power is up, and outputs a first command ready signal to the host. Further, the memory controller completes preparation to perform an operation corresponding to the second command by performing a second booting operation after the first booting operation, and outputs a second command ready signal to the host.

When the first command is received from the host after the first command ready signal is output and before the second command ready signal is output, the memory controller may perform the operation in response to the first command.

The first command may be a read command requesting for reading data stored in the semiconductor memory device. In this case, the memory controller may perform the first booting operation by configuring a map table representing a mapping relation between a logical block address and a physical block address by reading map data from a first meta region of the semiconductor memory device.

The second command may be a program command requesting for storing data in the semiconductor memory device. The memory controller may perform the second booting operation by determining whether a sudden power off occurs during a program operation of the semiconductor memory device by reading meta information from a second meta region of the semiconductor memory device, and processing a page, on which the program operation is performed, to be invalid based on a determination result.

Another exemplary embodiment of the present invention provides a computing system including a memory system. The computing system includes: a memory system including a semiconductor memory device; and a host suitable for transmitting a first command for accessing the semiconductor memory device and a second command of a different type from that of the first command. The memory system may complete preparation to perform an operation corresponding to the first command by performing a first booting operation when power is up, and output a first command ready signal to the host. The memory system may complete preparation to perform an operation corresponding to the second command by performing a second booting operation after the first booting operation, and output a second command ready signal to the host.

Still another exemplary embodiment of the present invention provides a method of operating a memory system in which a memory controller controls a semiconductor memory device and receives a first command and a second command of a different type from that of the first command from a host. The method includes: completing preparation to perform an operation corresponding to the first command by performing a first booting operation when power is up; outputting a first command ready signal to the host when the preparation to perform the operation corresponding to the first command is completed; completing preparation to perform an operation corresponding to the second command by performing a second booting operation after the second booting operation; and outputting a second command ready signal to the host when the preparation to perform the operation corresponding to the first command is completed.

Still yet another exemplary embodiment of the present invention provides a method of operating a memory system including a semiconductor memory device, and a memory controller suitable for controlling the semiconductor memory device, and receiving a read command for reading data stored in the semiconductor memory device and a program command for storing data in the semiconductor memory device from a host. The memory controller configures a map table representing a mapping relation between a logical block address and a physical block address by reading map data from a first meta region of the semiconductor memory device, and outputting a read command ready signal to the host. Further, the memory controller determines whether a sudden power off occurs during the program operation by reading meta information from a second meta region of the semiconductor memory device after the map table is configured, and processes a page, on which the program operation is performed, to be invalid based on a determination result to output a program command ready signal to the host.

According to the exemplary embodiments of the present invention, it is possible to provide the computing system having an improved operation speed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The above and other features and advantages of the present invention will become more apparent to those of ordinary skill in the art by describing in detail embodiments thereof with reference to the attached drawings in which:

FIG. 3 is a flowchart illustrating an operating method of a memory controller according to an exemplary embodiment of the present invention;

FIG. 4 is a block diagram illustrating an exemplary embodiment of the memory controller and a semiconductor memory device of FIG. 1;

FIG. 8 is a flowchart illustrating an operating method of a memory controller according to another exemplary embodiment of the present invention.

DETAILED DESCRIPTION

Hereinafter, an exemplary embodiment of the present invention will be described with reference to the accompanying drawings in detail. In the description below, it should be noted that only what is necessary for understanding the present invention will be explained so that the subject matter is not obscured. The present invention is not limited to the exemplary embodiments described herein, and may be embodied in other forms. The exemplary embodiments are provided for describing the present invention in detail so that those skilled in the art may easily practice the technical spirit of the present invention.

Throughout this specification and the claims that follow, when it is described that an element is "coupled" to another element, the element may be "directly coupled" to the other element or "electrically coupled" to the other element through a third element. Throughout the specification and the claims, unless explicitly described to the contrary, the word "comprise" and variations such as "comprises" or "comprising" will be understood to imply the inclusion of stated elements but not the exclusion of any other elements.

Figure 1:
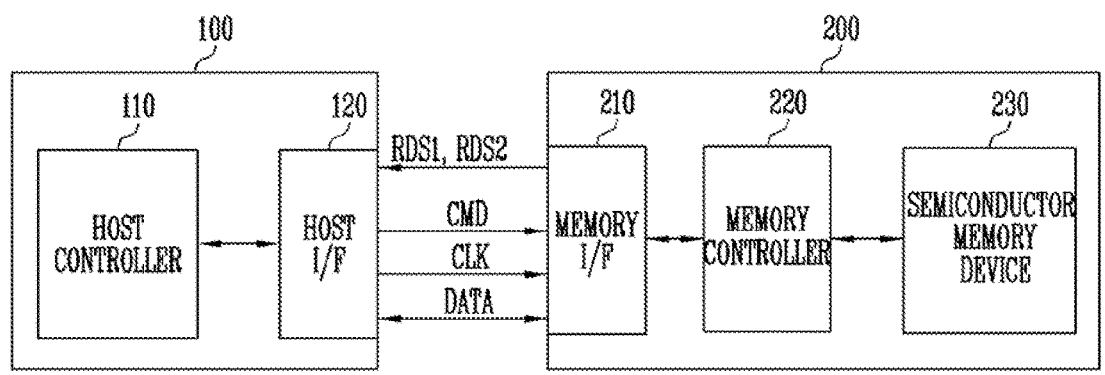
FIG. 1 is a block diagram illustrating a computing system according to an exemplary embodiment of the present invention.
Figure 2:
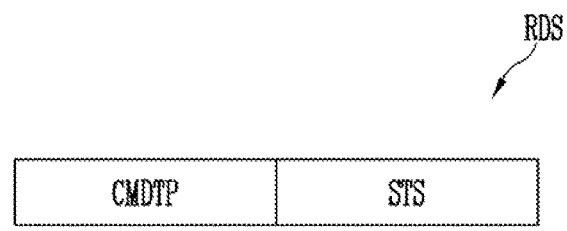
FIG. 2 is a diagram illustrating a format of any one between first and second command ready signals.

FIG. 1 is a block diagram illustrating a computing system 50 according to an exemplary embodiment of the present invention. FIG. 2 is a diagram illustrating a format of any one RDS between first and second command ready signals RDS1 and RDS2.

Referring to FIG. 1, the computing system 50 includes a host 100 and a memory system 200. The host 100 includes a host controller 110 and a host interface 120. The memory system 200 includes a memory interface 210, a memory controller 220, and a semiconductor memory device 230.

The host controller 110 communicates with the memory system 200 through the host interface 120. The host interface 120 provides an interface between the host controller 110 and the memory system 200. The host controller 110 writes data in the memory system 200, and reads data stored in the memory system 200. The host controller 110 transmits a command CMD, and a clock signal CLK generated by a clock generator (not illustrated) within the host 100 to the memory system 200. The command CMD may have a plurality of types. As a first type, the command CMD may be a read command for reading data stored in the semiconductor memory device 230. The read command may include information and a logical block address for specifying a read operation. As a second type, the command CMD may be a program command for storing data in the semiconductor memory device 230. The program command may include information and a logical block address for specifying a program operation. As a third type, the command CMD may be a command for obtaining predetermined information from the memory controller 220, for example, a size of a storage space of a RAM included in the memory controller 220 of FIG. 4. Commands of some types may require the logical block addresses. For example, each of the read command and the program command includes the logical block address.

In addition, various types of commands may be provided from the host 100 to the memory system 200.

As an exemplary embodiment, when the host 100 transmits the command CMD corresponding to the read command to the memory system 200, data DATA may be provided from the memory system 200 to the host 100. As an exemplary embodiment, when the host 100 transmits the command CMD corresponding to the program command to the memory system 200, data DATA may be provided from the host 100 to the memory system 200.

The memory controller 220 is connected between the memory interface 210 and the semiconductor memory device 230. The memory controller 220 communicates with the host 100 through the memory interface 210. The memory controller 220 performs an operation in response to the command CMD from the host 100. For example, when the command CMD corresponding to the read command is received, the memory controller 220 reads data stored in the semiconductor memory device 230, and transmits the read data DATA to the host 100. In this case, the memory controller 220 may additionally provide a processing result, that is, a response signal indicating that the operation in response to the read command is completed, to the host 100. For example, when the command CMD corresponding to the program command is received, the memory controller 220 stores the data DATA received from the host 100 to the semiconductor memory device 230. Then, the memory controller 220 may provide a processing result, that is, a response signal indicating that the operation in response to the program command is completed, to the host 100. For example, when a command for obtaining predetermined information from the memory controller 220 is received, the memory controller 220 provides required information to the host 100. For example, when the host 100 commands the memory system 200 to perform a background operation, the memory controller 220 may perform the background operation.

When power of the memory system 200 is up, the memory system 200 performs a booting operation. The memory controller 220 may load data stored in the semiconductor memory device 230, and perform the booting operation based on the loaded data. When the booting operation is completed, the memory system 200 may process the command transmitted from the host 100.

According to the exemplary embodiment of the present invention, the memory controller 220 completes preparation to perform an operation corresponding to a command of a first type when the power is up, and transmits a first command ready signal RDS1 to the host 100. The preparation to perform the operation corresponding to the command of the first type is defined as a first booting operation. The command of the first type may be a command, for example, the read command, for accessing the semiconductor memory device 230. Then, the memory controller 220 completes preparation to perform an operation corresponding to a command of a second type different from the first type, and transmits a second command ready signal RDS2 to the host 100. The preparation to perform the operation corresponding to the command of the second type is defined as a second booting operation.

Referring to FIG. 2, the command ready signal RDS includes command type information CMDTP and state information STS. Each of the command type information CMDTP and the state information STS may be configured by predetermined data bits. Any one of the command of the first type and the command of the second type may be specified according to the command type information CMDTP. The state information STS may contain information on whether preparation to perform an operation corresponding to a command of a specific type is completed. For example, the host controller 110 may decode the command type information CMDTP, and determine a command of a specific type corresponding to the command ready signal RDS. Further, when the state information STS indicates a specific value, the host controller 110 may recognize that preparation to perform an operation corresponding to a command of a specific type is completed.

It is assumed that the memory controller 220 transmits a ready signal to the host 100 after completing preparation to perform operations corresponding to all of the types of commands. The host 100 may stand by until the ready signal is received in order to transmit the command of the first type to the memory system 200. The host 100 may not access the memory system 200 with the command of the first type for a long time, until the ready signal is received. This may result in a decrease in operation speed of the computing system 50.

According to the exemplary embodiments of the present invention, when the host 100 receives the first command ready signal RDS1, the host 100 may transmit the command of the first type even though the second command ready signal RDS2 is not received yet, and receive a processing result for the corresponding command to the memory system 200. Accordingly, the host 100 may transmit the command of the first type to the memory system 200 within a short time after the power is up, and receive the processing result for the command of the first type within a short time after the power is up. Accordingly, the operation speed of the computing system 500 is improved.

FIG. 3 is a flowchart illustrating an operating method of the memory controller 220 according to an exemplary embodiment of the present invention.

Referring to FIGS. 1 and 3, in operation S110, power starts to be supplied to the memory system 200. In operation S120, the memory controller 220 completes preparation to perform an operation corresponding to a command of a first type by performing a first booting operation. In an exemplary embodiment, the command of the first type may be a read command. In operation S130, the memory controller 220 outputs the first command ready signal RDS1 to the host 100 when the first booting operation is completed.

The output of the first command ready signal RDS1 means that the operation in response to the command of the first type is ready to be performed. When the first command ready signal RDS1 is received, the host 100 may transmit the command of the first type to the memory system 200.

In operation S140, the memory controller 220 completes preparation to perform an operation in response to a command of a second type by performing a second booting operation. In an exemplary embodiment, the command of the second type may be a program command. In the meantime, the memory controller 220 may receive the command of the first type from the host 100 while the second booting operation is performed. In this case, the memory controller 220 may stop the second booting operation, and process the command of the first type. For example, the processor (not illustrated) within the memory controller 220 may generate an interrupt signal for the second booting operation, and then process the command of the first type.

In operation S150, the memory controller 220 outputs the second command ready signal RDS2 to the host 100 when the second booting operation is completed.

The output of the second command ready signal RDS2 means that the operation in response to the command of the second type is ready to be performed. When the second command ready signal RDS2 is received, the host 100 may transmit the command of the second type to the memory system 200.

Figure 5:
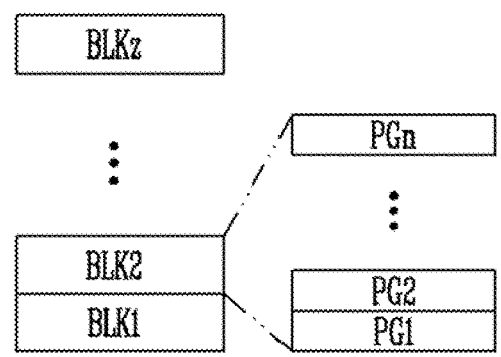
FIG. 5 is a diagram for describing memory blocks within a memory cell array of FIG. 4.

FIG. 4 is a block diagram Illustrating an exemplary embodiment of the memory controller 220 and the semiconductor memory device 230 of FIG. 1. FIG. 5 is a diagram for describing memory blocks BLK1 to BLKz within a memory cell array 231 of FIG. 4.

Referring to FIG. 4, the semiconductor memory device 230 includes the memory cell array 231 and a peripheral circuit 232 for driving the memory cell array 231. The semiconductor memory device operates under the control of the memory controller 220. The memory cell array 231 includes first to $z^{th}$ memory blocks BLK1 to BLKz. Each of the plurality of memory blocks BLK1 to BLKz includes a plurality of memory cells. Referring to FIG. 5, each of the first to $z^{th}$ memory blocks BLK1 to BLKz includes first to nth pages PG1 to PGn. Each of the first to nth pages PG1 to PGn may include a plurality of memory cells.

Referring back to FIG. 4, the peripheral circuit 232 controls the memory cell array 231. The peripheral circuit 232 operates under the control of the memory controller 220. The peripheral circuit 232 is configured to program data in the memory cell array 231, read data from the memory cell array 231, and erase data of the memory cell array 231 under the control of the memory controller 220.

As an exemplary embodiment, the read and the program operations of the semiconductor memory device 230 may be performed in one page units. During the program operation, the peripheral circuit 232 may receive data DATA (see FIG. 1) and a physical block address from the memory controller 220. One memory block and one page included in the one memory block may be selected by the physical block address. The peripheral circuit 232 may program the data DATA in the selected page. During the read operation, the peripheral circuit 232 may receive the physical block address from the memory controller 220. One memory block and a page included in the one memory block may be selected by the physical block address. The peripheral circuit 232 may read data from the selected page, and output the read data DATA to the memory controller 220.

In an exemplary embodiment, the semiconductor memory device 230 may be a flash memory device.

The memory controller 220 controls general operation of the semiconductor memory device 230. The memory controller 220 may access the semiconductor memory device 230 in response to a command CMD from the host 100 (see FIG. 1). For example, the memory controller 220 is configured to control read, write, erase, and background operations of the semiconductor memory device 230. The memory controller 220 is configured to provide an interface between the semiconductor memory device 230 and the host 100. The memory controller 220 is configured to drive firmware for controlling the semiconductor memory device 230.

The memory controller 220 includes a RAM 221 and a flash translation layer (FTL) 222. The RAM 221 operates under the control of the flash translation layer 222. In an exemplary embodiment, the RAM 221 may be formed of a Static RAM (SRAM), a Dynamic RAM (DRAM), and a Synchronous DRAM (SDRAM).

In an exemplary embodiment, the RAM 221 may be used as an operation memory of the flash translation layer 222. In an exemplary embodiment, the RAM 221 may be used as a buffer memory between the semiconductor memory device 230 and the host 100. For example, during the read operation, the data DATA read from the semiconductor memory device 230 may be temporarily stored in the RAM 221, and output to the host 100. During the program operation, the data DATA received from the host 100 may be temporarily stored in the RAM 221, and provided to the semiconductor memory device 230.

The flash translation layer 222 may access the semiconductor memory device 230 in response to the command CMD from the host 100. The program command from the host 100 may include a logical block address. The read command from the host 100 may include a logical block address.

When the power is up, the flash translation layer 222 may read map data from a first meta region of the semiconductor memory device 230 to configure a map table MPT including a mapping relation between the logical block address and the physical block address, and store the map table MPT in the RAM 221. In an exemplary embodiment, the first meta region may correspond to at least one of the first to $z^{th}$ memory blocks BLK1 to BLkz.

The map table MPT is loaded onto the RAM 221 so that the memory controller 220 may perform the read operation in response to the read command from the host 100. When the read command is received, the flash translation layer 222 may search for the logic block address included in the read command from the map table MPT, and extract a physical block address. The flash translation layer 222 transmits the extracted physical block address to the semiconductor memory device 230, and outputs data DATA read from the semiconductor memory device 230 to the host 100 (see FIG. 1). An operation of configuring the map table MPT by reading the map data from the semiconductor memory device 230 may be included in the first booting operation S120 (see FIG. 3). When the first booting operation is completed, the flash translation layer 222 may transmit a read command ready signal to the host 100 as the first command ready signal RDS1 (see FIG. 1) in operation S130 (see FIG. 3).

In the meantime, when the program command is received from the host 100, the flash translation layer 222 may search the map table MPT, and map the physical block address, in which the data is not stored, to the logical block address included in the program command. Then, the flash translation layer 222 may transmit the physical block address and data to be programmed to the semiconductor memory device 230. The flash translation layer 222 may update a mapping relation between the logical block address and the physical block address to the map table MPT. The updated map table MPT is updated in the first meta region of the semiconductor memory device 230.

It will now be assumed that a sudden power off occurs during the program operation. The peripheral circuit 232 may not normally store the data DATA in the selected page. The program operation may be terminated while abnormal data is stored in the selected page. Further, the flash translation layer 222 may not update the map table MPT. In the map table MPT, the logical block address corresponding to the selected page may be defined as a region in which data is not still stored. Then, when the program command is received, the flash translation layer 222 may map the corresponding physical block address to the logical block address included in the program command. Accordingly, the memory controller 220 may not normally perform the program operation corresponding to the program command only with the configuration of the map table MPT when the power is up.

The flash translation layer 222 may read meta information MET from a second meta region of the semiconductor memory device 230, and store the meta information MET in the RAM 221. The second meta region may correspond to at least one of the first to $z^{th}$ memory blocks BLK1 to BLkz. The meta information MET includes information for determining whether a sudden power off occurs during the program operation. It may be appreciated that various methods for determining whether a sudden power off occurs during the program operation are provided. The meta information MET may contain information for determining whether a sudden power off occurs in the methods.

For example, the meta information MET may contain history log information. The flash translation layer 222 may update information on a specific operation to the history log information whenever the memory controller 220 performs the specific operation. For example, the flash translation layer 222 may update the history log information whenever each of the read operation, the program operation, the erase operation, and the background operation of the semiconductor memory device 230 is performed. The flash translation layer 222 may update the history log information to the second meta region of the semiconductor memory device 230. The flash translation layer 222 may read the map table MPT and the history log information when the power is up, and compare the map table MPT with the history log information to determine whether a sudden power off occurs during the program operation.

For example, the meta information MET may include a result of an error correction for the data of a memory block including a recently programmed page. For example, the flash translation layer 222 may detect a memory block including a recently programmed page based on the history log information. The flash translation layer 222 may read data from each of the pages of the detected memory block. The read data may be decoded by an error correction block (not illustrated) within the memory controller 220. The failure of the error correction may mean that a sudden power off occurs while a corresponding page is programmed. According to the result of the error correction, it is possible to determine whether a sudden power off occurs during the program operation.

The flash translation layer 222 may determine whether a sudden power off occurs during the program operation by referring to the meta information MET stored in the RAM 221. When a sudden power off occurs during the program operation, the flash translation layer 222 processes the page, on which the program operation is performed, to be invalid. The operation of determining whether a sudden power off occurs and processing the page, on which the program operation is performed, to be invalid when a sudden power off occurs may be included in the second booting operation S140 (See FIG. 3). When the second booting operation is completed, the flash translation layer 222 may transmit a program command ready signal to the host 100 as the second command ready signal RDS2 (see FIG. 1) in operation S150 (see FIG. 3).

As an exemplary embodiment, the processing of the page, on which the program operation is performed while a sudden power off occurs, to be invalid includes marking the corresponding physical block address within the map table MPT as a non-empty space.

As an exemplary embodiment, the processing of the page, on which the program operation is performed while a sudden power off occurs, to be invalid may include programming dummy data in a corresponding page within the semiconductor memory device 230.

As an exemplary embodiment, the processing of the page, on which the program operation is performed while a sudden power off occurs, to be invalid may include copying data of a memory block including a corresponding page within the semiconductor memory device 230 to another memory block.

When the power of the computing system 50 is up, the host 100 may also perform a booting operation. In order to obtain data (hereinafter, a host boot code) for booting each of the components included in the host 100, the host 100 may transmit the read command to the memory system 200. The memory controller 220 may read the host boot code from the semiconductor memory device 230 in response to the read command, and transmit the read host boot code to the host 100 as data DATA (see FIG. 1). Then, the host 100 may perform a booting operation based on the host boot code. According to an exemplary embodiment of the present invention, the memory controller 220 may complete preparation to perform an operation corresponding to the read command by performing the first booting operation when the power is up, and transmit the read command read signal to the host. Even before the memory controller 220 completes preparation to perform an operation corresponding to another type of command such as the program command, the host 100 may transmit the read command to the memory controller 220. In this case, the host 100 may receive the host boot code within a short time after the power is up. Accordingly, the speed of the booting operation of the host 100 is improved.

Figure 6:
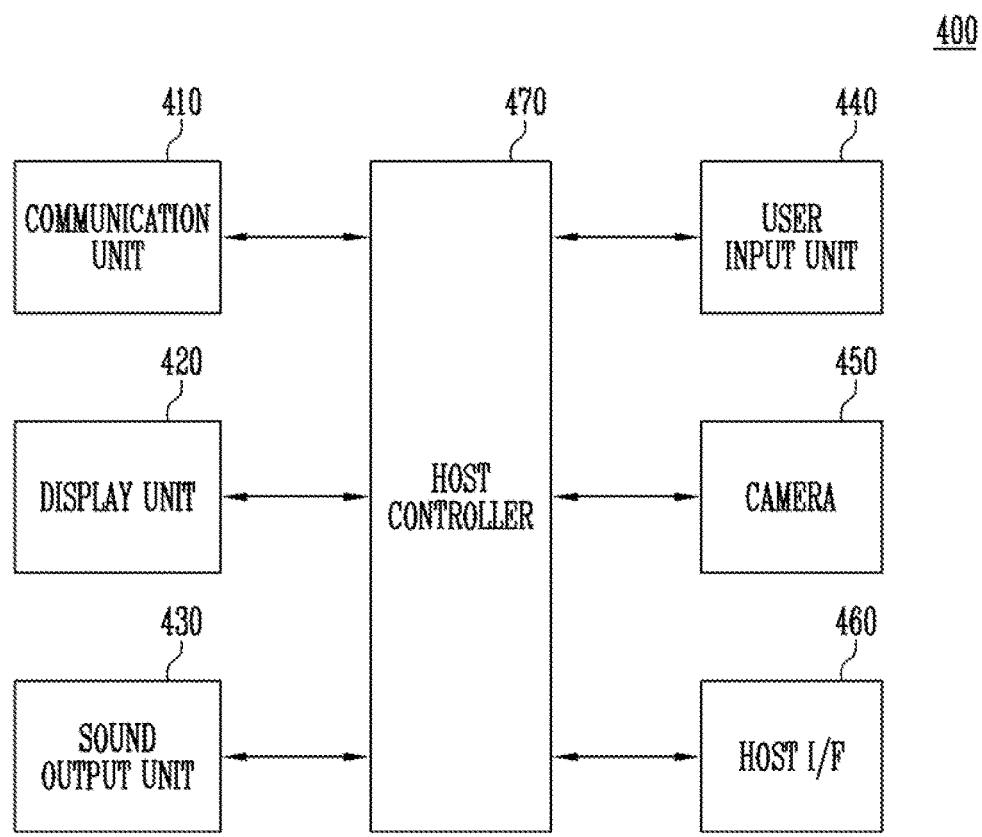
FIG. 6 is a block diagram illustrating an exemplary embodiment of a host of FIG. 1.

FIG. 6 is a block diagram illustrating an exemplary embodiment 400 of the host 100 of FIG. 1.

Referring to FIG. 6, the host 400 includes a communication unit 410, a display unit 420, a sound output unit 430, a user input unit 440, a camera 450, a host interface 460, and a host controller 470.

The communication unit 410 may include one or more components for performing communication between the host 400 and an external device (not shown). For example, the communication unit 410 may include a short range wireless communication unit and a mobile communication unit. The short range wireless communication unit may include a Bluetooth communication unit, a near field communication unit, a Wireless Local Area Network (WLAN) communication unit, a ZIgBee communication unit, an Infrared Data Association (IrDA) communication unit, a Wi-Fi Direct (WFD) communication unit, a Ultra Wide Band (UWB) communication unit, an Ant+ communication unit, and the like. The mobile communication unit may transceive a wireless signal with at least one of a base station, an external terminal, and a server over a mobile communication network.

The display unit 420 displays information processed by the host 100. When the display unit 420 and a touch pad are configured as a touch screen, the display unit 420 may also be used as an input device, in addition to an output device. The display unit 420 may include at least one of a liquid crystal display, a thin film transistor liquid crystal display, an organic light emitting diode, a flexible display, a 3D display, and an electrophoretic display.

The sound output unit 430 outputs audio data processed by the host 100. The sound output unit 430 may include a speaker, a buzzer, and the like.

The user input unit 440 is a device for inputting data for controlling the host 100 by a user. For example, the user input unit 440 may include a key pad, a dome switch, a touch pad implemented by a touch mode capacitive method, a pressure mode resistive method, an infrared detection method, a surface acoustic wave method, an integral strain gauge method, a piezo effect method, and the like, a jog wheel, a jog switch, and the like. The data received through the user input unit 440 may be processed by the host controller 470, and the processed data may be stored in the memory system 200 (see FIG. 1) through the host interface 460, or transmitted outside through the communication unit 410.

The camera 450 may obtain an image frame of a still image and a video through an image sensor. An image captured through the image sensor may be processed by the host controller 470. The processed image frame may be stored in the memory system 200 through the host interface 460, or transmitted to the outside through the communication unit 410.

The host interface 460 may interface with the host 400 and the memory system 200. The host interface 460 may be configured and operated similar to the host interface 120 described with reference to FIG. 1.

The host controller 470 controls a general operation of the host 400. The host controller 470 is configured to control the communication unit 410, the display unit 420, the sound output unit 430, the user input unit 440, the camera 450, and the host interface 460. The host controller 470 may be configured and operated similar to the host controller 110 described with reference to FIG. 1.

After the power of the host 400 is up, the host controller 470 may transmit a read command to the memory system 200 in order to obtain a host boot code corresponding to each of the communication unit 410, the display unit 420, the sound output unit 430, the user input unit 440, the camera 450, and the host interface 460. Based on the obtained host boot code, the host controller 470 may boot the communication unit 410, the display unit 420, the sound output unit 430, the user input unit 440, the camera 450, and the host interface 460. According to the exemplary embodiment of the present invention, the memory controller 220 (see FIG. 1) completes preparation to perform an operation corresponding to the read command by performing the first booting operation when the power is up, and transmits the read command read signal to the host 400. Even before the memory controller 220 completes preparation to perform an operation corresponding to another type of command, the host 100 may transmit the read command to the memory controller 220, and obtain a host boot code. Accordingly, the speed of the booting operation of the host 400 is improved.

Figure 7:
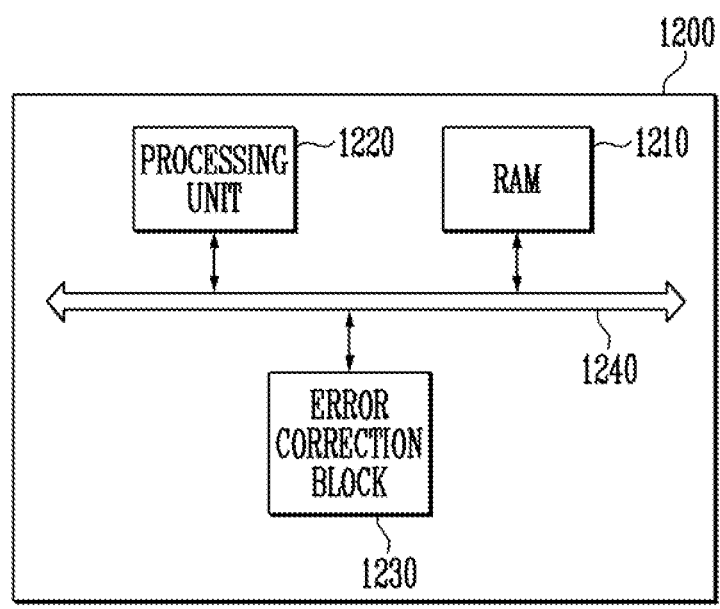
FIG. 7 is a block diagram illustrating an exemplary embodiment of the memory controller of FIG. 1.

FIG. 7 is a block diagram illustrating an exemplary embodiment 1200 of the memory controller 220 of FIG. 1.

Referring to FIG. 7, the memory controller 1200 includes a Random Access Memory (RAM) 1210, a processing unit 1220, an error correction block 1230, and a bus 1240.

The RAM 1210 may be provided as the RAM 221 of FIG. 4. The RAM 1210 may be used as at least one among an operation memory of the processing unit 1220, a cache memory between the semiconductor memory device 230 (see FIG. 1) and the host 100 (see FIG. 1), and a buffer memory between the semiconductor memory device 230 and the host 100. The processing unit 1220 controls general operation of the memory controller 1200. The processing unit 1220 and the RAM 1210 may perform a function of the flash translation layer 222 of FIG. 4. For example, the processing unit 1220 may load at least one of a program command, a data file, and a data structure onto the RAM 1210, and execute the loaded data to perform the function of the flash translation layer 222.

The memory interface 210 of FIG. 1 may be connected to the bus 1240, and include a protocol for performing data exchange between the host 100 and the memory controller 1200. As an exemplary embodiment, the memory interface of FIG. 1 is configured to communicate with the host 100 through at least one of various interface protocols such as a Universal Serial Bus (USB) protocol, a Multimedia Card (MMC) protocol, a Peripheral Component Interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, and an Integrated Drive Electronics (IDE) protocol, and a private protocol.

The error correction block 1230 is configured to decode data read from the semiconductor memory device 230 based on an error correction code. As an exemplary embodiment, the memory controller 1200 may further include a module for interfacing with the semiconductor memory device 230.

FIG. 8 is a flowchart Illustrating an operation method of the memory controller 220 according to another exemplary embodiment of the present invention.

Referring to FIGS. 1, 4, and 8, in operation S210, power starts to be supplied to the computing system 50. In operation S221, the memory controller 220 configures a map table MPT by reading map data. The memory controller 220 may read the map data from the first meta region of the semiconductor memory device 230, configure the map table MPT including a mapping relation between a logical block address and a physical block address based on the map data, and store the configured map table MPT in the RAM 221. Operation S221 may be included in operation S120 described with reference to FIG. 3.

In operation S230, the memory controller 220 outputs a read command ready signal to the host 100. When the read command ready signal is received, the host 100 may transmit a read command to the memory controller 220. The host 100 may obtain a host boot code corresponding to each of the components 410 to 460 (see FIG. 6) within the host 100 by transmitting the read command, and boot each of the components within the host 100 based on the host boot code. In this case, the host 100 may obtain various identification information such as capacity, manufacturer, serial number, and the like, of the memory system 200 by transmitting an additional read command.

In operation S241, the memory controller 220 loads meta information MET. The memory controller 220 may read the meta information MET from the second meta region of the semiconductor memory device 230, and store the meta information MET in the RAM 221. In operation S242, the memory controller 220 determines whether sudden power off occurs during a program operation based on the meta information MET. If a sudden power off occurs during the program operation, operation 243 is performed. In operation S243, the memory controller 220 may process a page, on which the program operation is performed when a sudden power off occurs, to be invalid. The memory controller 220 may mark a physical block address corresponding to the page, on which the program operation is performed when a sudden power off occurs, as a non-empty space. Operations S241 to S243 may be included in operation S140 described with reference to FIG. 3.

In operation S250, the memory controller 220 outputs a program command ready signal to the host 100.

According to an exemplary embodiment of the present invention, the memory controller first completes preparation to perform an operation corresponding to a specific type of command by performing a first booting operation when power is up, and transmits a first command ready signal to the host. When the first command ready signal is received, the host may transmit the specific type of command to the memory system even though another command ready signal is not received yet, and receive a processing result for the corresponding command from the memory system. Accordingly, operation speeds of the host and the computing system including the host and the memory controller are improved.

Embodiments have been disclosed in the drawings and the specification. The specific terms used herein are for illustration, and do not limit the scope of the present invention as defined in the claims. Accordingly, those skilled in the art will appreciate that various modifications and other equivalent examples may be made without departing from the scope and spirit of the present disclosure. Therefore, the scope of the present invention will be defined by the accompanying claims.

What is claimed is:

1. A memory system comprising:
  a semiconductor memory device; and
  a memory controller configured to control the semiconductor memory device, and receive a first command to acquire data stored in the semiconductor memory device, and a second command to write data in the semiconductor memory device from a host,
  wherein the memory controller completes preparation to perform a first operation corresponding to the first command by performing a first booting operation when power is up, and outputs a first command ready signal to the host regardless of a request of the host, and then completes preparation to perform a second operation corresponding to the second command by performing a second booting operation after the first booting operation, and outputs a second command ready signal to the host regardless of a request of the host, and
  wherein the first command ready signal and the second command ready signal comprise command type information and state information, respectively, the command type information specifying the first command or the second command, and the state information containing information on whether the preparation to perform the operation corresponding to a command type is completed.

2. The memory system of claim 1, wherein, when the first command is received from the host after the first command ready signal is output and before the second command ready signal is output, the memory controller performs the first operation in response to the first command.

3. The memory system of claim 1, wherein the first command is a read command requesting for reading data stored in the semiconductor memory device.

4. The memory system of claim 1, wherein the memory controller performs the first booting operation by configuring a map table representing a mapping relation between a logical block address and a physical block address by reading map data from a first meta region of the semiconductor memory device.

5. The memory system of claim 1, wherein the second command is a program command requesting for storing data in the semiconductor memory device.

6. The memory system of claim 1, wherein the memory controller performs the second booting operation by determining whether a sudden power off occurs during a program operation of the semiconductor memory device by reading meta information from a second meta region of the semiconductor memory device, and processing a page, on which the program operation is performed, to be invalid based on a determination result.

7. A computing system comprising:
a memory system including a semiconductor memory device; and
a host configured to transmit a first command to acquire data stored in the semiconductor memory device and a second command to write data in the semiconductor memory device,
wherein the memory system completes preparation to perform a first operation corresponding to the first command by performing a first booting operation when power is up, and outputs a first command ready signal to the host regardless of a request of the host, and then completes preparation to perform a second operation corresponding to the second command by performing a second booting operation after the first booting operation, and outputs a second command ready signal to the host regardless of a request of the host, and
wherein the first command ready signal and the second command ready signal comprise command type information and state information, respectively, the command type information specifying the first command or the second command, and the state information containing information on whether the preparation to perform the operation corresponding to a command type is completed.

8. The computing system of claim 7, wherein the host transmits the first command to the memory system after the first command ready signal is received and before the second command ready signal is received.

9. The computing system of claim 7, wherein the memory system performs the first operation in response to the first command before outputting the second command ready signal.

10. The computing system of claim 7, wherein the host transmits the second command to the memory system after the second command ready signal is received.

11. The computing system of claim 7, wherein the first command is a read command requesting for reading data stored in the semiconductor memory device.

12. The computing system of claim 7, wherein the memory system further includes a memory controller which performs the first booting operation by configuring a map table representing a mapping relation between a logical block address and a physical block address by reading map data from a first meta region of the semiconductor memory device.

13. The computing system of claim 7, wherein the second command is a program command requesting for storing data in the semiconductor memory device.

14. The computing system of claim 7, wherein the memory system further includes a memory controller that performs the second booting operation by determining whether a sudden power off occurs during a program operation of the semiconductor memory device by reading data from the semiconductor memory device, and processing a page, on which the program operation is performed, to be invalid based on a determination result.

15. A method of operating a memory system in which a memory controller controls a semiconductor memory device and receives a first command to acquire data stored in the semiconductor memory device and a second command to write data in the semiconductor memory device from a host, the method comprising:
completing preparation to perform a first operation corresponding to the first command by performing a first booting operation when power is up;
outputting a first command ready signal to the host regardless of a request of the host when the preparation to perform the first operation corresponding to the first command is completed;
completing preparation to perform a second operation corresponding to the second command by performing a second booting operation after the first booting operation; and
outputting a second command ready signal to the host regardless of a request of the host when the preparation to perform the second operation corresponding to the second command is completed,
wherein the first command ready signal and the second command ready signal comprise command type information and state information, respectively, the command type information specifying the first command or the second command, and the state information containing information on whether the preparation to perform the operation corresponding to a command type is completed.

16. The method of claim 15, further comprising:
performing the first operation in response to the first command when the first command is received from the host after the first command ready signal is output and before the second command ready signal is output.

17. The method of claim 15, wherein the first command is a read command requesting for reading data stored in the semiconductor memory device.

18. The method of claim 15, wherein the second command is a program command requesting for storing data in the semiconductor memory device.

19. The method of claim 15, wherein the performing of the first booting operation comprises:
configuring a map table representing a mapping relation between a logical block address and a physical block address by reading map data from a first meta region of the semiconductor memory device.

20. The method of claim 15, wherein the performing of the second booting operation comprises:

determining whether a sudden power off occurs during a program operation of the semiconductor memory device by reading meta information from a second meta region of the semiconductor memory device; and processing a page, on which the program operation is performed, to be invalid based on a determination result.

* * * * *